Dec. 7, 1926.

R. H. REED

OILING DEVICE FOR BEARINGS

Filed Nov. 11, 1925

1,609,496

INVENTOR
Robert H. Reed.
BY
Herbert G. Ogden
HIS ATTORNEY

Patented Dec. 7, 1926.

1,609,496

UNITED STATES PATENT OFFICE.

ROBERT H. REED, OF EASTON, PENNSYLVANIA, ASSIGNOR TO INGERSOLL-RAND COMPANY, OF JERSEY CITY, NEW JERSEY, A CORPORATION OF NEW JERSEY.

OILING DEVICE FOR BEARINGS.

Application filed November 11, 1925. Serial No. 68,256.

This invention relates to bearings, but more particularly to an oiling device for thrust bearings.

One object of the invention is to insure uniform and constant supply of lubricant to the cooperative surfaces of the thrust bearing and a shaft rotatable in the bearing at all speeds of the shaft.

Other objects will appear hereinafter.

The invention consists of the combinations of elements, features of construction and arrangement of parts having the general mode of operation substantially as hereinafter described and more particularly pointed out in the appended claims and illustrated in the accompanying drawings, in which—

Figure 1:
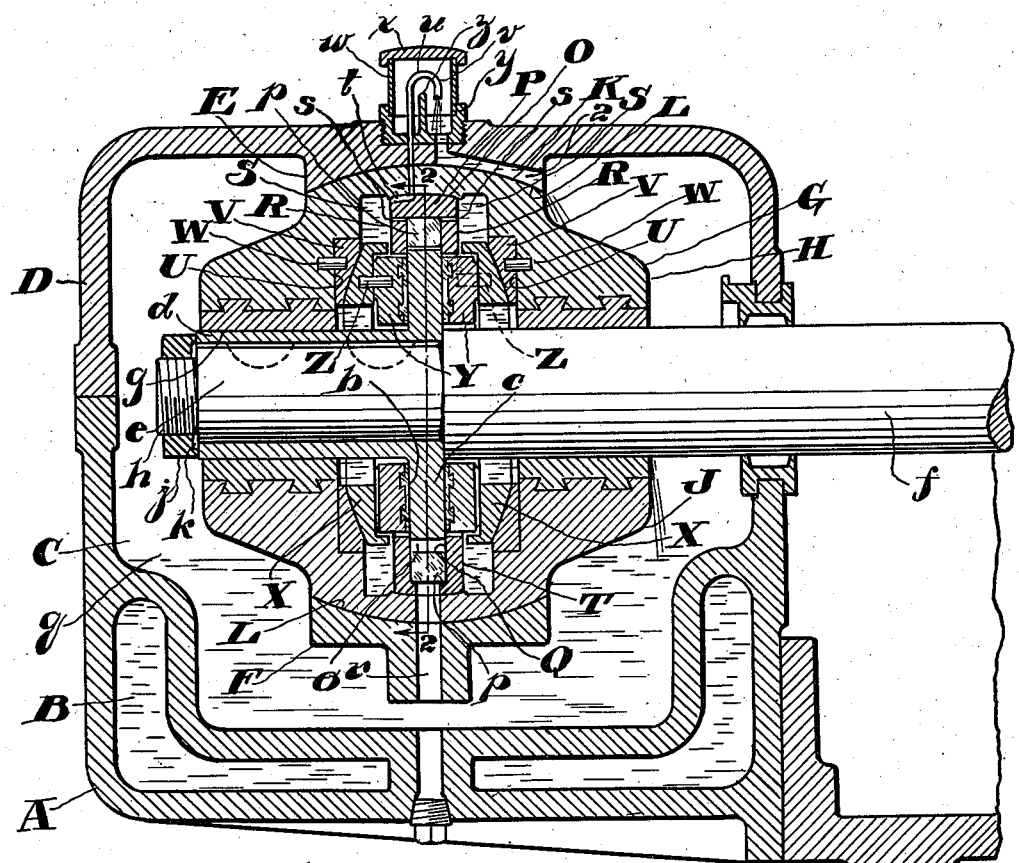
Figure 2:
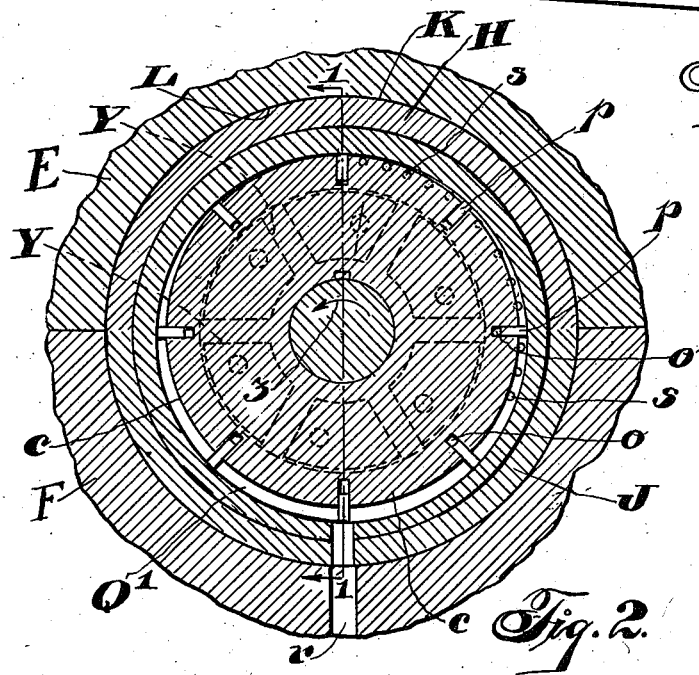

Figure 1 is an elevation in section of a thrust bearing and a shaft equipped with an oiling device constructed in accordance with the practice of the invention taken on the line 1—1 of Figure 2 looking in the direction of the arrows, and Figure 2 is a transverse sectional view taken through Figure 1 on the line 2—2 looking in the direction of the arrows.

Referring to the drawings, A indicates a bearing housing of any suitable shape having a water jacket B and an oil reservoir C. Secured to the top of the bearing housing A is a cover D with which may be formed integrally a bearing support E. A bearing support F preferably formed integrally with the bearing housing A cooperates with the bearing support E to form a continuous support for a thrust bearing G. The thrust bearing G in this instance comprises a top section H and a bottom section J and has an outer spherical bearing portion K which cooperates with a correspondingly spherical bore L in the bearing supports E and F for preventing longitudinal movement of the thrust bearing G, while at the same time permitting said bearing to be rocked through a vertical plane.

Formed within the bearing G, preferably intermediate its ends, is a chamber O in which in this instance is arranged centrally a ring P having an eccentric bore Q. Integrally with the ring P and at each end thereof are formed inwardly extending flanges R which, with the ring P, form oil chambers S on each side thereof.

In the present instance annular recesses U are formed in the bearing G adjacent the oil chambers S to receive equalizing washers V which are preferably secured against rotation, by means of dowel pins W. The inner faces of the equalizing washers V are preferably concave to receive convex faced base rings X. As is usual in bearings of this type, radial bearing shoes Y are supported by the base rings X and may be secured to said base rings in any suitable manner, such as for instance, dowel pins Z. The inner faces of the radial bearing shoes Y are preferably so arranged that they are in alignment with the inner faces of the flanges R and thus form a chamber $b$ within which rotates a thrust collar $c$. The thrust collar $c$ is preferably formed with an integral sleeve $d$ and is keyed to the reduced end $e$ of a shaft $f$. The outer surface of the sleeve $d$ is of substantially the same diameter as the shaft $f$ and cooperates with a bore $g$ of the bearing G to support the shaft. The sleeve $d$ may be held against longitudinal movement with respect to the shaft $f$ in any suitable manner. In this instance the end of the reduced extension $e$ is threaded as at $h$ to receive a suitable nut $j$. The nut $j$ is preferably provided with a recess $k$ on its inner face so that when the said nut is screwed firmly in position, it will contact only with the end of said sleeve. The periphery of the thrust collar $c$ is concentric with the longitudinal axis of the shaft $f$ and is adapted to contact only with one point of the ring P. In this way a gradually narrowing chamber $Q'$ is formed between the ring P and the thrust collar $c$. The sides of the thrust collar in this instance also cooperate with the inner sides of the flanges R to prevent direct communication between the chamber $Q'$ and the oil chamber S at that point.

In accordance with the present invention, a plurality of radial slots $o$ are formed across the outer surface of the thrust collar $c$ to slidably receive vanes $p$. The vanes $p$ are of substantially the same width as the chamber $b$ and are formed at their outer ends to conform to the radius of the bore Q.

In order that oil $q$ in the reservoir C may be drawn from said reservoir into the chamber $Q'$, a passage $r$ is formed through the bearing support F and through the bearing section J. To the end that oil carried between the vanes $p$ may be conveyed into the chambers S, a plurality of small ports or passages $s$ are formed throughout a portion of the flanges R, preferably at the juncture of said flanges with the ring P. The passages s may be of any number to accommodate or pass all oil which may be carried between the vanes p and are all arranged on one side of the point at which the thrust collar contacts with the ring P, depending of course upon the direction in which said thrust collar is to be rotated.

Suitable means are provided for preventing formation of air pockets in the chambers S. To this end a groove t is formed partly across the outer face of the ring P to register with a tube u extending through the top bearing section H and through the cover D, and having a hooked portion v at its outer end. The hooked portion v of the tube u is in this instance encased by a transparent tube w provided with a suitable cover x. In this instance a seat y for the tube w is screwed into the cover D and is provided with a weir z for directing any oil which may be discharged through the tube toward a passage 2 leading from the interior of the seat y to the side of the bearing support E for the return of such oil to the reservoir C.

In the operation of the device: Assuming that the shaft f is being rotated in the direction of the arrow 3 in Figure 2. With the shaft, and consequently the thrust collar c, rotating in this direction oil will be drawn through the passage r from the reservoir C and will be carried between the vanes to the passages s and will be forced through said passages into the chambers S. If, as sometimes happens, air drawn from the reservoir C by the vanes p is forced or carried into the chambers S, such air may find a free escape from the top of said chambers through the groove t and through the tube u. Similarly if the pressure of the oil in the chambers S reaches a certain predetermined value, the excess oil may find its way back to the reservoir C through the channels described for venting the chambers S.

This invention has been found to operate satisfactorily and well and enables a constant and positive supply of oil to be maintained between all cooperating surfaces of the bearing parts and of the bearing and the shaft, irrespective of the speed at which the shaft may be rotated.

I claim:—

In an oiling device, the combination of a bearing having a central chamber therein and an oil reservoir outside the bearing, said bearing having a passage leading from the oil reservoir to the central chamber, a shaft rotatable in the bearing, a ring in the central chamber in the bearing arranged concentrically about the shaft and having an eccentric bore forming a pump chamber, internal flanges on the ring forming oil chambers in the ends of the central chamber, said flanges having small ports, a thrust collar on the shaft and concentric therewith to rotate in the ring, said thrust collar cooperating with the flanges to form a fluid tight joint, and vanes in the thrust collar adapted to be forced radially outwardly against the ring by the rotative action of the thrust collar for drawing oil through the said passage from the reservoir into the ring and for forcing such oil under pressure through the ports from the pump chamber of the ring into the oil chamber at each side of the ring and thence to cooperative relatively movable surfaces of the bearing and the shaft.

In testimony whereof I have signed this specification.

ROBERT H. REED.